(No Model.)
W. L. JENKINS.
PRACTICE TABLET FOR STENOGRAPHERS.
No. 342,102. Patented May 18, 1886.
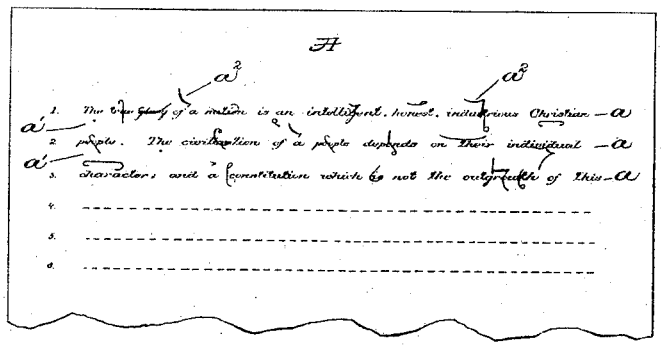

United States Patent Office.

WILLIAM L. JENKINS, OF BOSTON, MASSACHUSETTS.

PRACTICE-TABLET FOR STENOGRAPHERS.

SPECIFICATION forming part of Letters Patent No. 342,102, dated May 18, 1886.

Application filed February 19, 1886. Serial No. 192,559. (No model.)

*To all whom it may concern:*

Be it known that I, WILLIAM L. JENKINS, of Boston, county of Suffolk, and State of Massachusetts, have invented an Improvement in Students' Tablets or Charts, of which the following description, in connection with the accompanying drawings, is a specification, like letters on the drawings representing like parts.

This invention has for its object to provide a tablet to facilitate stenographic students in their practice for the attainment of speed.

The invention consists of a tablet preferably having several lines printed upon it in very small type—as, for instance, diamond—the lines being placed at considerable distance apart, so that the printed lines may serve the purpose of a ruled line, upon which to write the stenographic characters.

The student, reading the printed matter upon the tablet, writes in stenographic characters as he reads, using the printed line as a line upon which to write.

I have preferably attached a dozen similarly-printed tablets in block form, and a key is provided for each block of similarly-printed tablets, which shows the correct character to be used by the student in writing, the lines of both the key and the tablet being numbered to aid the student in this particular.

Figure 1 shows a portion of a printed tablet or leaf, the stenographic characters being written thereon to represent the tablet after the same has been used; Fig. 2, a portion of the key, and Fig. 3 an edge view of a set or block of leaves with the key attached thereto.

The leaves A, of which there may be several, and blocked or otherwise connected together, as shown in Fig. 3, have several lines printed upon them, as at $a$, the type employed being very small—as, for instance, that known to the trade as "diamond" type. The several lines are located at considerable distance apart as compared with the height of the letters, as at $a'$. The lines $a$, printed from very small type, serve as a line upon which stenographic characters $a^2$ are written, the spaces between the lines being sufficient to permit the characters to be written in their different positions.

The student employing the tablets reads the printed matter thereon and writes directly over it, using the same as a line as he reads, and, the printing being very plain, it may be read with rapidity, permitting him to follow with stenographic characters very fast.

Should the student have doubts as to the proper way the character should be written, he may refer to the key B, which is preferably the first leaf of the block, and contains the properly-written stenographic characters.

The lines of both the key B and leaf A are correspondingly numbered, to facilitate ready reference to the written word or phrase.

It is customary among stenographic students to employ persons to read to them for practice in the attainment of speed; but such employment is very tedious to the reader, as it is often necessary to repeat a passage, and also quite essential to the student that an article be read several times that he may become familiar with it.

It will be seen that by the employment of the tablet herein described the student may obtain speed-practice without the employment of a reader, and whenever he is in doubt as to the proper form or position of a character he may refer to the key. It is necessary that the printing be of small type, that the same may be used as a line upon which to write the stenographic characters, and also to permit the characters to be written in proximity to each other on each line, as it is obvious that, should ordinary printed lines be employed, the letters would be so high as to cause ambiguity in writing, and also to follow the printing correctly the characters would be spread far apart.

I preferably employ about a dozen leaves, A, similarly printed and attached together in a set, and as each leaf is written upon by the student it may be destroyed. The tablet is also of aid to young students as instruction-charts, words being printed in small type instead of sentences.

It is obvious that for advanced students the key may be omitted.

I claim—

The herein-described student's tablet or chart, consisting of one or more leaves having matter printed thereon in small type, the lines of printed matter being spaced at considerable distance apart and serving as lines, upon which stenographic characters may be written, combined with a key containing a number of stenographic characters to correspond with the printed matter upon the leaves, all substantially as and for the purpose set forth.

In testimony whereof I have signed my name to this specification in the presence of two subscribing witnesses.

WILLIAM L. JENKINS.

Witnesses:
BERN. J. NOYES,
F. CUTTER.